(12) United States Patent
Cuoghi et al.

(10) Patent No.: US 9,828,972 B2
(45) Date of Patent: Nov. 28, 2017

(54) METHOD OF DE-ICING A WIND TURBINE BLADE

(71) Applicant: VESTAS WIND SYSTEMS A/S, Aarhus N (DK)

(72) Inventors: Joe Cuoghi, Ryde Hampshire (GB); Karl Gregory, Cowes (GB); Robert Townsend, Cowes (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 534 days.

(21) Appl. No.: 14/373,153

(22) PCT Filed: Jan. 9, 2013

(86) PCT No.: PCT/DK2013/050005
§ 371 (c)(1),
(2) Date: Oct. 13, 2015

(87) PCT Pub. No.: WO2013/107457
PCT Pub. Date: Jul. 25, 2013

(65) Prior Publication Data
US 2016/0040654 A1    Feb. 11, 2016

Related U.S. Application Data

(60) Provisional application No. 61/649,335, filed on May 20, 2012.

(30) Foreign Application Priority Data

Jan. 20, 2012    (DK) .................................. 2012 70035
May 16, 2012    (DK) .................................. 2012 70254

(51) Int. Cl.
*F03D 11/00*    (2006.01)
*F03D 1/06*    (2006.01)
(Continued)

(52) U.S. Cl.
CPC ........ *F03D 11/0025* (2013.01); *F03D 1/0675* (2013.01); *F03D 7/042* (2013.01);
(Continued)

(58) Field of Classification Search
CPC ........ F03D 80/40; F03D 17/00; F03D 1/0675; F03D 7/042; Y02E 10/721; F05B 2260/20
See application file for complete search history.

(56) References Cited

U.S. PATENT DOCUMENTS 2,510,170 A * 6/1950 Chillson ................ B64D 15/02
244/134 B
7,217,091 B2 * 5/2007 LeMieux ................ F01D 11/00
415/905

(Continued)

FOREIGN PATENT DOCUMENTS

CA    2228145 C    11/2003
CA    2795881 A1   10/2011
(Continued)

OTHER PUBLICATIONS

International Search Report for PCT/DK2013/050005, dated Apr. 17, 2013.
Danish Search Report for PA 2012 70254, dated Dec. 12, 2012.

*Primary Examiner* — Gregory Anderson
*Assistant Examiner* — Eldon Brockman
(74) *Attorney, Agent, or Firm* — Patterson + Sheridan, LLP (57) ABSTRACT

A method of de-icing a wind turbine blade (5) comprises the steps of: generating heated air using heating means (10) provided in the root portion of the blade; and continuously circulating the heated air around the interior of the blade through at least a portion of two more longitudinal blade cavities (24, 26, 28) defined within the blade. The circulating step includes: channeling the heated air from an outlet (32a) of the heating means at least part way through a first longitudinal blade cavity (26), towards the tip end (18) of the blade; at a position along the length of the blade, diverting the heated air from the first longitudinal blade cavity (26) into a second longitudinal blade cavity (24); and channeling the diverted air at least part way through the second longitudinal blade cavity (24) back to an inlet (34) of the heating means (10). The heated air is circulated through at least a central cavity (24) and a leading edge cavity (26) defined between longitudinal webs (22) within the blade.

27 Claims, 3 Drawing Sheets

(51) Int. Cl.
*F03D 7/04* (2006.01)
*F03D 80/40* (2016.01)
*F03D 17/00* (2016.01)

(52) U.S. Cl.
CPC ............ *F03D 17/00* (2016.05); *F03D 80/40* (2016.05); *F05B 2260/20* (2013.01); *Y02E 10/721* (2013.01)

(56) References Cited

U.S. PATENT DOCUMENTS

| | | | | |
|---|---|---|---|---|
| 8,029,239 B2* | 10/2011 | Luetze | .................... | F03D 15/05 |
| | | | | 416/91 |
| 9,169,830 B2* | 10/2015 | Weitkamp | ............. | F03D 1/0675 |
| 2006/0018752 A1* | 1/2006 | LeMieux | ................ | F01D 11/00 |
| | | | | 416/96 R |
| 2013/0101414 A1* | 4/2013 | Weitkamp | ............. | F03D 1/0675 |
| | | | | 416/1 |

FOREIGN PATENT DOCUMENTS

| | | | |
|---|---|---|---|
| DE | 19528862 | A1 | 2/1997 |
| DE | 19644355 | A1 | 4/1998 |
| DE | 102010051297 | A1 | 5/2012 |
| EP | 1375913 | A1 | 1/2004 |
| EP | 1788239 | A2 | 5/2007 |
| WO | 2011/160793 | A2 | 12/2011 |

\* cited by examiner

METHOD OF DE-ICING A WIND TURBINE BLADE

The present invention relates to a method of de-icing a wind turbine blade by circulating heated air through the interior of the blade. The present invention further relates to a wind turbine including one or more wind turbine blades adapted for the de-icing method of the invention.

The formation of ice on the surface of the blades of a wind turbine is a relatively common problem, even in moderate climates. The build-up and spread of ice on the blade surface, in particular in the tip portion of the blade, will change the blade aerodynamics and may also lead to increased vibrations and loading on the blade, all of which lead to a reduction in power output. In more severe cases, the turbine may need to be shut down upon accumulation of ice, to prevent excessive loading of the blades which may damage or prematurely fatigue the blade components. Furthermore, there may be safety concerns associated with the potential risk of ice being thrown off the wind turbine blades, which may mean that the turbine must be shut down until the ice can be removed. Clearly, any extended periods of shutdown will adversely impact the energy production of the turbine.

It has therefore been recognised that it is important to equip wind turbines with effective systems for preventing the formation of ice on the wind turbine blade, or removing ice that has already been formed on the blade surface. It is also important to provide accurate means for detecting the formation of ice on the wind turbine at an early stage.

The use of heated air to heat the surface of a wind turbine blade in order to prevent ice formation or remove ice from the blade has been previously proposed. In such methods, the heating of the blade surface causes the thawing of the ice at the interface between the ice and the blade surface, whereby the ice can slide off the blade under its own weight. For example, DE-A-842330 describes a system in which air is drawn through the nacelle, where it is heated by the generator apparatus, before being drawn through the interior of the blade by centrifugal forces. The heated air is ejected from the tip end of the blade.

It would be desirable to provide an improved system and method for de-icing of a wind turbine, which is effective at removing ice from the blade surface and which can be incorporated into new and existing wind turbine blades at relatively low cost and without significant modification of the blade structure. It would be particularly desirable if such a de-icing system and method could be integrated into the wind turbine controls such that the system and method can be accurately controlled in response to conditions at the blade surface.

According to the invention there is provided a method of de-icing a wind turbine blade, the method comprising the steps of: generating heated air using heating means provided in the root portion of the blade; and continuously circulating the heated air around the interior of the blade through at least a portion of two more longitudinal blade cavities defined within the blade. During the circulating step, the heated air is first channeled from an outlet of the heating means at least part way through a first longitudinal blade cavity, towards the tip end of the blade. At a position along the length of the blade, the heated air is then diverted from the first longitudinal blade cavity into a second longitudinal blade cavity. The diverted air is then channeled at least part way through the second longitudinal blade cavity back to an inlet of the heating means. During the de-icing method, it is essential that the heated air is circulated through at least a central cavity defined between longitudinal webs extending through the interior of the blade, and a leading edge cavity defined between one or more longitudinal webs and the leading edge of the blade.

In the de-icing method of the present invention, the heated air generated in the root portion of the blade is circulated through the interior of the blade, into contact with the inner surfaces of the blade outer shell. As it circulates through the cavity structure of the blade, the heated air transfers heat to the outer shell such that the temperature of the outer shell increases. As described above, this causes at least the layer of the ice that is in contact with the blade surface to thaw. The adhesion between the ice and the blade surface is therefore lost and the ice will either melt completely, or slide off the blade under its own weight.

Wind turbine blades used on commercial wind turbines are typically formed of an outer shell and an inner support structure. Reinforcement may be provided in the outer shell, within the inner support structure, or both. In certain types of wind turbine blade, the majority of the reinforcement material is provided within a longitudinal inner spar or beam extending through the interior of the outer shell. The inner spar typically comprises spar caps in contact with or integral to the outer shell at the pressure side and the suction side of the blade. Longitudinal webs extend between the edges of the spar caps to form a hollow, tubular structure. The longitudinal webs define a cavity inside of the inner spar and cavities on either side of the spar, at the leading edge and trailing edge of the blade.

In other types of wind turbine blade, the majority of the reinforcement material is provided within the outer shell. An inner spar is therefore not required but two or more longitudinal webs or rims extending between the pressure side and the suction side of the outer shell will typically be provided. The longitudinal webs divide the interior volume of the blade into a number of longitudinal cavities, including at least a central cavity extending through the middle of the blade, a leading edge cavity and a trailing edge cavity.

It can therefore be seen that in the majority of wind turbine blades, two or more longitudinal webs will be provided as standard in the interior of the blade, which divide the blade interior into different cavities, as described above.

The de-icing method of the present invention advantageously uses the cavity structure defined within the blade to help direct the air through the blade in a defined circulation pattern. Since the majority of wind turbine blades are formed with such a cavity structure already in place, as described above, relatively little modification of the blade structure is required in order to make the blade compatible for use with the de-icing method. The de-icing method can therefore advantageously be implemented in a variety of different types of blade structure and can be easily implemented in existing blades, as well as with newly manufactured blades.

The de-icing method of the present invention sets up a circulation of heated air within the blade, which can conveniently be performed with the air already present inside the blade so that it is not necessary to draw in air from outside. The air is channeled around the blade in a circular flow path so that the air can be continuously recycled through the heating means and around the blade. This provides a very efficient way to establish a continuous flow of heated air through the blade. In particular, a system using a circular flow path requires less power input in order to reach a target temperature within the blade than is required for an open flow system in which there is no recirculation of the air within the blade.

The air is heated to a temperature above the temperature of the ambient air within the blade interior. However, the degree of heating and the temperature of the heated air will depend upon the conditions at the blade and the circulation pattern of the heated air that is used. In some cases, it may be sufficient to heat the air to a temperature that is only slightly above the ambient air temperature inside the blade. In other cases, it may be desirable to provide warmer air that is able to transfer more heat to the blade surfaces.

The heated air is generated in the root portion of the blade, which is the portion of the blade closest to the hub. The heated air is then channeled or pumped through the interior of the blade, in a longitudinal direction towards the tip end of the blade. The term "longitudinal" defines the direction along the length of the blade, substantially parallel to the longitudinal axis of the blade. The "tip end" of the blade is the peripheral end of the blade furthest from the hub and the "tip portion" of the blade is the portion of the blade providing the tip end. In most cases, it will be desired to channel the heated air from the root portion of the blade into the tip portion, along as much of the length of the blade as possible, so that the tip portion including the tip end of the blade is heated. This will typically be important, since the formation of ice may have a particularly significant effect on the aerodynamic efficiency of the blade in the tip portion of the blade, which sweeps out a larger area than the root end.

The internal volume of the blade decreases towards the tip end as the blade chord decreases, so that it becomes more difficult to channel sufficient air through the blade at greater distances from the root end. The use of the central cavity in addition to the leading edge cavity for the circulation of the heated air provides an efficient way of delivering as high a volume as possible of heated air to the tip portion of the blade. The central cavity is typically of a well defined shape and volume and it can be readily isolated from the adjacent cavities in order to provide a convenient flow pathway for the heated air.

In order to perform the de-icing method of the present invention, heating means must be incorporated into the root end of the blade for providing heated air into the blade interior. The heating means within the blade are adapted to channel the heated air along one or more longitudinal blade cavities towards the tip end of the blade. The heating means therefore preferably include one or more fans, pumps or other suitable means for injecting or pumping a flow of heated air into the interior of the blade. The heating means will preferably also include suitable means for sucking or drawing the air back through the blade from the tip portion back to the root end.

In order to set up the circular flow pattern of the heated air within the interior of the blade, the blade must be adapted to divert the heated air between blade cavities. The way in which the diversion of the heated air between cavities can be achieved will depend upon the blade structure and the desired pathway of the heated air around the interior of the blade.

In some cases, the existing internal blade structure may be sufficient to divert the air between cavities in the desired way. In other cases, it may be necessary to incorporate additional structures within the interior of the blade to establish more defined flow pathways and thereby ensure that the heated air is diverted as required. Additional structures may include, for example, one or more partitions, baffles, bulkheads or webs which may be positioned in order to block specific flow pathways, or to divide a flow of the heated air and divert different portions in different directions. Alternatively or in addition, suitable flow pathways may be provided by incorporating one or more holes, openings or conduits extending between the different cavities of the blade and providing a defined flow pathway for the heated air. Specific means for diverting the heated air will be described below with reference to specific de-icing methods.

In a first embodiment of the invention, the de-icing method comprises the steps of: channeling at least a portion of the heated air from an outlet of the heating means through the leading edge cavity, towards the tip end of the blade; at a position along the length of the blade, diverting the heated air from the leading edge cavity into the central cavity; and channeling the diverted air through the central cavity back to an inlet of the heating means.

In methods according to the first embodiment of the invention, the heated air is therefore channeled outwards through the blade in the leading edge cavity and is returned back towards the heating means through the central cavity. The term "outwards" refers to the direction towards the tip end of the blade.

Preferably, in addition to channeling heated air outwards along the blade in the leading edge cavity, heated air is additionally channeled from an outlet of the heating means along a trailing edge cavity defined between one or more longitudinal webs and the trailing edge of the blade. This portion of heated air is similarly diverted into the central cavity at a position along the length of the blade and channeled back towards an inlet of the heating means through the central cavity. The heated air is therefore channeled outwards through both the leading edge and trailing edge cavity whilst being channeled back to the heating means through the central cavity only.

The additional use of the trailing edge cavity to channel heated air along the blade may provide a number of benefits. The trailing edge cavity typically provides a relatively large volume and the flow rate of heated air towards the tip end of the blade can therefore be significantly increased by channeling the heated air through the trailing edge cavity as well as the leading edge cavity, thereby providing more efficient heating of the blade surface. In addition, by channeling the heated air through both the trailing edge and leading edge cavities it may be possible to provide a more uniform heating of the blade surface, since the heated air can be brought into contact with a greater surface area of the blade shell.

Preferably, the air is diverted from the leading edge cavity into the central cavity at a position within the tip portion of the blade, so that the heated air is effective in heating and de-icing the tip end of the blade. Where heated air is additionally channeled through the trailing edge cavity, this portion of the heated air is preferably also diverted into the central cavity in the tip portion of the blade.

In order to adapt a wind turbine blade for use with the de-icing method according to the first embodiment of the invention, suitable diverting means for directing the air around the tip portion of the blade between the different cavities are therefore incorporated into the tip portion of the blade. Suitable diverting means may include, for example, a baffle or bulkhead extending from the tip end of the blade into the end of the central cavity. The diverting means preferably define separate flow pathways from the leading edge cavity and the trailing edge cavity into the central cavity, whilst substantially preventing heated air from being transferred between the leading edge and trailing edge cavities.

In methods according to the first embodiment of the invention in which heated air is channeled through both the leading edge and trailing edge cavities, separate heating means may be provided to generate the heated air for each cavity. More preferably, a single heating means is provided in the root portion of the blade and the method further comprises the step of distributing the heated air from one or more outlets of the heating means into the leading edge cavity and the trailing edge cavity. The distribution of the heated air may be achieved through the incorporation of a suitable air distribution system in the root portion of the blade. The air distribution system preferably includes a first outlet for directing heated air into the trailing edge cavity and a second outlet for directing heated air into the leading edge cavity.

Preferably, the method of the first embodiment of the invention further comprises the step of controlling the flow of heated air to the leading edge and trailing edge cavities. This means that the parameters of the air supplied to each cavity, including for example the temperature and the mass flow rate, can be independently controlled to meet the individual requirements of the blade.

In a second embodiment of the present invention, the de-icing method comprises the steps of: channeling at least a portion of the heated air from an outlet of the heating means through a trailing edge cavity defined between one or more longitudinal webs and the trailing edge of the blade, towards the tip end of the blade; at a position along the length of the blade, diverting a first portion of the heated air from the trailing edge cavity into the central cavity and diverting a second portion of the heated air from the trailing edge cavity into the leading edge cavity; and channeling the heated air through the leading edge cavity and the central cavity, back to one or more inlets of the heating means.

In methods according to the second embodiment of the invention, the heated air is therefore channeled outwards through the blade in the trailing edge cavity and is returned back to the heating means through both the central cavity and the leading edge cavity.

As described above in relation to the first embodiment, the use of the trailing edge cavity to channel heated air towards the tip end of the blade is advantageous, since the trailing edge cavity provides a relatively large volume which enables a high flow rate of heated air into the tip portion of the blade.

Preferably, the heated air is diverted from the trailing edge cavity into the central cavity and the leading edge cavity in the tip portion of the blade and most preferably, at the tip end of the blade. This enables the circulation of the heated air to be carried out with minimal structural modification of the blade, since the tip end of the blade will naturally divert the air flowing from the trailing edge cavity back down the remainder of the blade. In some cases, it will therefore not be necessary to incorporate separate means for diverting the heated air between the cavities. In other cases, additional structural means may be provided in the tip portion of the blade to help guide the heated air from the trailing edge cavity into the central cavity and the leading edge cavity.

Where the tip portion of the blade has a relatively small transverse cross-sectional area, at least a portion of the heated air may be diverted from the trailing edge cavity into the central cavity before it reaches the tip end of the blade. This helps to maintain the flow of heated air through the tip portion of the blade. The air may be diverted from the trailing edge cavity into the central cavity through one or more openings or channels provided in the longitudinal web or webs separating the trailing edge cavity and the central cavity. For example, a plurality of spaced apart openings may be provided in the longitudinal web, in the tip portion of the blade. The heated air is therefore gradually diverted into the central cavity as it approaches the tip end of the blade, so that the volume of heated air passing around the tip end of the blade is reduced.

De-icing methods according to the second embodiment of the present invention may be advantageously employed with blades having additional insulation material within the trailing edge cavity. Such insulation material may be incorporated, for example, to provide additional structural support to the blade. The presence of the insulation material within the trailing edge cavity means that the heated air can be channeled to the tip portion of the blade with reduced loss of heat to the surrounding blade surface as the heated air travels through the trailing edge cavity. This means that hotter air can be more easily delivered to the tip portion of the blade where the need for heating is greatest.

The use of both the central cavity and the leading edge cavity to channel the heated air back towards the heating means optimises the heating in the tip portion by maximising the surface area of the blade with which the heated air comes into contact. Furthermore, the use of both the central cavity and the leading edge cavity helps to maintain the higher flow rate that is possible through the trailing edge cavity, as described above, in particular in the tip portion of the blade where the transverse cross section of the central cavity and the leading edge cavity is relatively small.

Preferably, in methods according to the second embodiment of the invention, the first portion of the heated air, which is being channeled back through the central cavity, is diverted out of the central cavity into the leading edge cavity at a position along the length of the blade. The diverted first portion of the heated air is then channeled back to the heating means in combination with the second portion of the heated air in the leading edge cavity. The heated air therefore only passes through a portion of the central cavity before being diverted into the leading edge cavity with the rest of the heated air. The heated air is then channeled back to the heating means in a single stream in the leading edge cavity. This advantageously means that only a single inlet for receiving the returned air is required at the heating means.

The first portion of heated air is preferably diverted into the leading edge cavity at a position which is at least one quarter of the way along the length of the blade from the tip end and more preferably, at least one third of the way along the length of the blade from the tip end. The heated air therefore remains within the central cavity in at least the tip portion of the blade. By the time the heated air is diverted from the central cavity into the leading edge cavity, the transverse cross-sectional area of the leading edge cavity will be sufficiently large that the full volume of the heated air can be accommodated.

In order to divert the first portion of heated air from the central cavity to the leading edge cavity, a suitable partition or barrier is preferably provided within the central cavity to block the remainder of the central cavity. A suitable flow path between the central cavity and the leading edge cavity is then preferably provided at or adjacent to the partition. For example, holes or channels may be provided in the longitudinal web or webs separating the central cavity from the leading edge cavity.

In methods according to the second embodiment of the invention in which heated air is channeled outwards through the trailing edge cavity and is returned to the heating means through the leading edge cavity, heating means are preferably provided that include an outlet positioned to direct heated air into the trailing edge cavity and an inlet positioned to receive air from the leading edge cavity.

In certain alternative embodiments, the heated air may be channeled around the blade in the reverse direction to that described above for the second embodiment. In such embodiments, the heated air is therefore channeled outwards through the leading edge cavity and the central cavity and is returned to the heating means through the trailing edge cavity.

In a third embodiment of the present invention, the de-icing method comprises the steps of: channeling the heated air from an outlet of the heating means through the central cavity towards the tip end of the blade; at a position along the length of the blade, diverting at least a portion of the heated air from the central cavity into the leading edge cavity; and channeling the diverted air through the leading edge cavity back towards an inlet of the heating means.

In methods according to the third embodiment of the invention, the heated air is therefore channeled outwards through the blade in the central cavity and is returned back to the heating means through the leading edge cavity.

The heated air can conveniently be channeled towards the tip end of the blade through the central cavity, without the need for significant structural modification of the blade structure. However, to ensure that the heated air remains relatively well insulated within the central cavity, additional insulation material is preferably incorporated within the central cavity. For example, when the central cavity is defined within an inner spar, as described below, additional insulation material is preferably incorporated within the spar in order to minimise heat transfer through the spar. In such cases, the heated air will not come into significant contact with the outer shell of the blade whilst being channeled through the central cavity and with additional insulation within the spar, the heat can be effectively retained. It may therefore be possible to deliver hotter air to the tip portion of the blade, so that de-icing in the tip portion can be carried out in an efficient way.

Preferably, in addition to diverting the heated air from the central cavity into the leading edge cavity, a portion of the heated air is additionally diverted from the central cavity into a trailing edge cavity defined between one or more longitudinal webs and the trailing edge of the blade. This portion of heated air is then channeled back towards an inlet of the heating means through the trailing edge cavity. The heated air is therefore channeled back to the heating means at the root end through both the leading edge and trailing edge cavity whilst being channeled out from the heating means through the central cavity only.

The additional use of the trailing edge cavity to channel hot air along the blade may provide a number of benefits, as described above in relation to the first embodiment.

Preferably, the heated air is diverted from the central cavity into the leading edge cavity and optionally into the trailing edge cavity in the tip portion of the blade and most preferably, at the tip end of the blade. In most cases, the central cavity does not extend all of the way to the tip end of the blade and the heated air will therefore exit the central cavity at a short distance from the tip end. Suitable means for diverting the heated air into the leading edge cavity and optionally into the trailing edge cavity can conveniently be provided within the space between the end of the central cavity and the tip end of the blade.

Suitable diverting means may include, for example, a baffle or bulkhead extending from the tip end of the blade into the end of the central cavity. The diverting means preferably define separate flow pathways from the central cavity into the leading edge cavity and the trailing edge cavity, whilst substantially preventing heated air from being transferred between the leading edge and trailing edge cavities.

A portion of the heated air may optionally be diverted from the central cavity into the leading edge and trailing edge cavities before the heated air reaches the end of the central cavity at the tip end. This may enable a higher flow rate of heated air around the blade, since the space between the end of the central cavity and the tip end of the blade is typically very limited. For example, one or more openings may optionally be provided in the longitudinal webs defining the central cavity, which provide flow passages from the central cavity into the leading edge and trailing edge cavities. Preferably, a plurality of openings is provided at spaced apart positions along the longitudinal webs, within the tip portion of the blade.

De-icing methods according to any of the embodiments of the present invention may further comprise the steps of: monitoring the temperature at the blade; and controlling the heating means to adjust the temperature of the heated air generated depending on the temperature at the blade. Suitable temperature sensors may be provided on the exterior blade surface or within the interior of the blade in order to monitor the temperature at the blade. The temperature sensors may be provided in order to monitor the air temperature, or the temperature of the blade surface. A feedback loop may then be established, wherein the output from the temperature sensor is received by a controller associated with the heating means, which controls the heating means to adjust the temperature to the desired level. The feedback loop may also act as a safety measure to prevent overheating of the blade.

Alternatively or in addition to the step of monitoring the temperature at the blade, de-icing methods of the present invention may further comprise the steps of: monitoring the air flow within the blade; and controlling the heating means depending on the air flow. Suitable pressure sensors, such as differential pressure switching sensors, may be provided within the blade in order to monitor the air flow within one or more of the blade cavities. The output from the pressure sensors may be received by a controller associated within the heating means, which controls the heating means to adjust the level of heating depending on the air flow. Preferably, the controller switches off the heating means upon detection of a low or zero air flow within the blade, thereby providing a safety device to prevent overheating of the blade.

The parameters of the heating means that may be controlled in response to the output from the temperature or pressure sensors include: the power supplied to the heating means and/or the flow rate of air through the heating means. The time period over which the heating means remains switched on may also be controlled in response to the output.

De-icing methods according to the invention are intended for the removal of ice that has formed on the blade. It is therefore unnecessary for heated air to be continuously circulated through the blade at all times during operation. In order to reduce the energy expenditure associated with the de-icing method, it is more preferable to only activate the circulation of heated air when ice has been detected on the blade surface and for the heating means to remain switched off when no ice is present on the blade.

Methods according to the invention therefore further comprise the steps of monitoring the wind turbine to detect the presence of ice on the blade surface and activating the circulation of heated air upon detection of ice. In this way, de-icing is performed only when ice is detected on the blade, thereby optimising the efficiency of the de-icing system.

The blade surface may be directly monitored using suitable ice sensors mounted on the blade, which are connected to the controller for the heating means. When a certain level of ice is detected by the ice sensors, the ice sensors send an output signal to the controller to activate the heating means.

Alternatively or in addition, the presence of ice on the blade surface can be indirectly detected by monitoring the power curve of the turbine to detect changes to the power curve that occur as a result of ice formation. The formation of ice on the blade surface has a sufficient impact on the aerodynamic properties of the blade and the power output from the turbine that a change in the power curve can be detected, even at relatively low ice levels. Upon the detection of a change in the power curve associated with ice formation, a signal can be sent to the controller of the heating means to activate the heating means and commence the de-icing method.

By continuously monitoring the blade, either with ice sensors or by means of the power curve, it is possible to detect the formation of ice on the blade surface at a very early stage, before the ice has thickened or spread to a significant degree. If the de-icing method can be activated at this early stage, the power required to achieve de-icing of the blade can be minimised.

According to the present invention there is further provided a wind turbine including one or more wind turbine blades, each blade comprising: an outer shell; and one or more longitudinal webs provided within the outer shell and extending longitudinally through the interior of the blade. The one or more longitudinal webs define a cavity structure within the interior of the blade including: a longitudinal leading edge cavity defined between the leading edge of the blade and one or more longitudinal webs, a longitudinal trailing edge cavity defined between the trailing edge of the blade and one or more longitudinal webs, and a central cavity defined between a pair of longitudinal webs and positioned between the leading edge cavity and the trailing edge cavity. Heating means for generating heated air are provided in the root portion of the blade, the heating means comprising: one or more air inlets; one or more heaters for heating air entering through the one or more inlets; one or more air outlets; and means for circulating the heated air from the one or more outlets around the interior of the blade and back to the one or more inlets. The heating means are adapted to circulate heated air through at least the leading edge cavity and the central cavity.

Wind turbines according to the present invention therefore include one or more wind turbine blades that are adapted for the de-icing method of the invention, as defined above. In particular, the one or more blades each include heating means for generating heated air and establishing a circulation of the heated air through the cavity structure within the blade. The interior of the blade includes a structure of longitudinal webs defining a cavity structure including a leading edge cavity, a trailing edge cavity and a central cavity. Other cavities may additionally be defined within the interior of the blade. As described above, conventional wind turbine blades typically include an arrangement of longitudinal webs extending between the pressure side and suction side of the outer shell and defining this arrangement of cavities. Each cavity preferably extends along substantially the full length of the blade, from the root end to a position close to the tip end of the blade.

The circulation pattern of the heated air around the interior of the blade can be controlled to a large extent by adapting the shape and position of the heating means within the root portion of the blade. Preferably, the one or more air outlets are positioned to release heated air from the heating means into one or more of the longitudinal cavities. An outlet is therefore preferably positioned or mounted at the root end of each longitudinal cavity through which the heated air is to be channeled outwards. Preferably, the one or more inlets are similarly positioned to receive or draw air from one or more of the longitudinal cavities, wherein the air that is received at the inlet has been circulated around the blade interior to transfer heat to the blade outer shell. An inlet is therefore preferably positioned or mounted at the root end of each longitudinal cavity through which the heated air is to be channeled back to the heating means, at the root end thereof.

Preferably, the main body of the heating means is mounted within the central cavity of the blade and a suitable air distribution manifold is provided to distribute the heated air to the appropriate cavities and to receive the recycled air back from within the blade.

Preferably, the heating means comprises one or more fans or pumps for establishing a flow of the heated air through the longitudinal cavities. The one or more fans or pumps are adapted to draw air into the heating means through the one or more inlets of the heating means and then pass the air through or over the one or more heaters before pumping the heated air out through the one or more outlets.

Suitable heaters for heating the air drawn into the heating means would be well known to the skilled person but may include, for example, one or more resistive heating elements which heat the air as the air is drawn over the elements. The heating means will typically be connected to a power supply within a stationary part of the turbine, such as the nacelle. The heating means may optionally be provided with means for cleaning the air as it is drawn through, including for example one or more filters.

Each blade of the wind turbines according to the present invention further comprises means for diverting the heated air from one of the longitudinal cavities into at least one of the other longitudinal cavities. As described above, the form and position of the diverting means will depend upon the de-icing method which is selected for the blade and the existing internal blade structure.

Diverting means are preferably provided between at least two of the longitudinal blade cavities, in the tip portion of the blade. As described above, it is particularly desirable to circulate the heated air around the tip portion of the blade, since this where the formation of ice can potentially have the greatest impact on the performance of the blade. It is therefore desirable to establish a circulation of the heated air in which the heated air is channeled along substantially the full length of the blade, to the tip end thereof, before being diverted and returned to the root end of the blade. In certain preferred examples, the diverting means comprises a partition extending from the tip end of the blade. Suitable diverting means have been described above in relation to the method of the present invention and will be described in more detail below with reference to preferred embodiments of the wind turbine of the invention.

Alternatively or in addition to diverting means provided in the tip portion of the blade, diverting means may be provided at one or more intermediate positions between the root end of the blade and the tip end of the blade. This may be desirable for certain de-icing methods which require the diversion of heated air between cavities at a position away from the tip end. For example, in the de-icing method according to the second embodiment of the present invention, diverting means are required for the diversion of heated air from the central cavity into the leading edge cavity, at a distance from the tip end of the blade.

Wind turbines according to the present invention may include one or more wind turbine blades that are adapted for use with the de-icing method according to the first embodiment of the invention, as described above. In such wind turbine blades, the heating means of each blade comprises an outlet for channeling heated air into the leading edge cavity of the blade and an inlet for receiving air channeled through the central cavity. This enables a circulation of heated air to be established from the heating means, through the leading edge cavity towards the tip end of the blade, and back through the central cavity to the root end of the blade.

Preferably, the heating means of blades adapted for use with the de-icing method according to the first embodiment of the invention further comprises an outlet for channeling heated air into the trailing edge cavity of the blade. This enables the heated air to be channeled towards the tip end through both the leading edge and the trailing edge cavities.

In such blades, diverting means are preferably provided at the tip end of the central cavity to provide a first flow pathway from the leading edge cavity to the central cavity and a second flow pathway from the trailing edge cavity to the central cavity. For example, a partition may be provided extending from the tip end of the blade into the end of the central cavity, which directs the heated air from the leading edge cavity and the trailing edge cavity into the central cavity but substantially prevents the transfer of the heated air between the leading edge and trailing edge cavities.

The heating means in each blade preferably further comprises control means for independently controlling at least one of the temperature and the flow rate of the heated air channeled into each of the leading edge and trailing edge cavities.

Wind turbines according to the present invention may alternatively include one or more wind turbine blades that are adapted for use with the de-icing method according to the second embodiment of the invention, as described above. In such wind turbine blades, the heating means of each blade comprises an outlet for channeling heated air into the trailing edge cavity of the blade and an inlet for receiving air channeled through the leading edge cavity. This enables a circulation of heated air to be established from the heating means, through the trailing edge cavity towards the tip end of the blade, and back through the central cavity and the leading edge cavity.

In such blades, a partition is preferably provided within the central cavity at a position along the length of the central cavity and one or more openings are provided within the longitudinal webs to provide a flow pathway between the central cavity and the leading edge cavity, wherein the one or more openings are provided at one or more locations between the partition and the tip end of the blade.

Preferably, the one or more openings provided in the longitudinal webs additionally provide a flow pathway between the trailing edge cavity and the central cavity. This means that the heated air can flow from the trailing edge cavity to the leading edge cavity, through the central cavity at one or more locations between the partition and the tip end of the blade. As described above, this arrangement enables the flow of heated air through the tip portion of the blade to be maintained at a relatively high level, despite the reduced cross section of the blade in this region. This in turn provides more efficient heating of the blade tip.

Wind turbines according to the present invention may alternatively include one or more wind turbine blades that are adapted for use with the de-icing method according to the third embodiment of the invention, as described above. In such wind turbine blades, the heating means of each blade comprises an outlet for channeling heated air into the central cavity of the blade and an inlet for receiving air channeled through the leading edge cavity. This enables a circulation of heated air to be established from the heating means, through the central cavity towards the tip end of the blade, and back through the leading edge cavity.

Preferably, the heating means of blades adapted for use with the de-icing method according to the first embodiment of the invention further comprises an inlet for receiving air channeled through the trailing edge cavity. This enables the heated air to be channeled back from the tip end of the blade through both the leading edge and trailing edge cavities.

In such blades, diverting means are preferably provided at the tip end of the central cavity to provide a first flow pathway from the central cavity to the leading edge cavity and a second flow pathway from the central cavity to the trailing edge cavity. For example, a baffle may be provided at the end of the central cavity to divide the flow of heated air into two portions, one of which will be diverted back through the leading edge cavity and the other of which will be diverted back through the trailing edge cavity.

In wind turbines according to the present invention, each blade may further comprise means for isolating the longitudinal cavities from each other at the root end of the blade. This may advantageously ensure that the desired circulation of heated air is maintained within the interior of the blade by preventing unwanted flow of air between the longitudinal cavities at the root end of the blade. The set up of a closed loop within the blade will also help to ensure that the air is passed through the heating means as efficiently as possible.

In certain blades, the leading edge and trailing edge cavities may be effectively closed at the root end by means of the longitudinal webs, which may extend all the way through the root portion of the blade until they meet the blade wall. In other blades, an additional partition or seal may be required at the root end of the longitudinal cavities in order to isolate the cavities from each other.

The closure of the longitudinal cavities at the root end may also be advantageous in preventing escape of the heated air out of the blade so that the heated air can be effectively recycled around the blade in a substantially closed loop.

As described above in relation to the method claims, wind turbine blades are typically formed with at least two longitudinal webs extending between the pressure side and the suction side of the blade. The longitudinal webs extend in a longitudinal direction from the root end, preferably to a position at or close to the tip end of the blade.

In certain preferred embodiments of the invention, the wind turbine includes one or more blades comprising an inner spar extending through the interior of the blade, wherein the spar includes a pair of webs defining the central cavity. The central cavity is therefore provided by the space within the inner spar. The cavity within the inner spar provides a convenient, well defined and relatively well insulated space through which to channel the heated air, either from the root end or back to the root end. The pair of longitudinal webs forming the inner spar conveniently also defines the leading edge and trailing edge cavities on either side of the spar, so that the desired cavity structure can be provided within the interior of the blade in relatively simple way. The cavity within the inner spar is isolated from the cavities on either side along the full length of the spar such that it is possible to establish a well defined flow of the heated air around the blade interior.

The one or more blades of the wind turbines according to the present invention may further comprise insulation material within the trailing edge cavity. In certain blades, insulation material will be provided within the trailing edge cavity for structural purposes, to provide support to the blade in this region. Blades including insulation material in the trailing edge cavity may be particularly well adapted for the de-icing methods according to the invention in which at least a portion of the heated air is channeled through the trailing edge cavity towards the tip end of the blade. The insulation material advantageously reduces the heat loss from the heated air so that hotter air can be delivered to the tip portion of the blade.

The insulation material may be in the form of a foamed core which at least partially fills the trailing edge cavity. Alternatively, the insulation material may be in the form of a sandwich material comprising a plurality of layers of insulation material. For example, a sandwich material may be applied to the inner surface of the outer shell.

Alternatively or in addition to any insulation material provided in the trailing edge cavity, insulation material may be provided within the central cavity of each blade, along at least a part of the length of the blade. Blades including insulation material in the central cavity may be particularly well adapted for the de-icing methods according to the invention in which at least a portion of the heated air is channeled through the central cavity towards the tip portion of the blade.

The one or more blades of the wind turbines according to the invention may be adapted so that heated air may moves freely within the longitudinal cavities defined in the interior of the blade. Alternatively, each blade may further comprise one or more air ducts or pipes for channeling the heated air into or out of the heating means. Depending on the internal blade structure, such ducting may be helpful in controlling the circulation of the heated air and directing the heated air into and out of the heating means as efficiently as possible.

Each of the one or more blades of the wind turbines according to the invention preferably further comprises control means for controlling the heating means within that blade. Where the turbine includes a plurality of blades, the heating means of each blade will have an individual control means associated with it so that the de-icing of each blade can be independently controlled. Advantageously, each heating means can also be switched off independently from the others within the same turbine, for example, in the case of malfunction of one of the heating means.

As described above, the control means may receive output signals from temperature sensors associated with the blade, so that the flow of heated air can be controlled in response to temperature conditions at the blade. Each blade therefore preferably further comprises one or more temperature sensors for monitoring the temperature at the blade and providing an output to the control means associated with the heating means within that blade, wherein the control means is adapted to operatively control the heating means based on the received output from the temperature sensors.

Alternatively or in addition to temperature sensors, each blade may further comprise one or more pressure sensors, such as a pressure differential switch sensor, for monitoring the airflow within the blade and providing an output to the control means associated with the heating means within that blade. The control means is adapted to operatively control the heating means based on the received output from the pressure sensors. Preferably, the control means is adapted to switch off the heating means when the detected air flow falls below a threshold value. For example, as a safety measure, the control means is preferably adapted to switch off the heating means when substantially no air flow is detected within the blade.

The control means associated with a heating means may be adapted to operatively control at least one of the following parameters in response to the measured temperature or air flow: the power supplied to the one or more heaters, the speed through which air is circulated through the heating means, and the heating cycle of the one or more heaters.

Conventional horizontal axis wind turbines will typically include three wind turbine blades. Where a plurality of blades is provided on a wind turbine according to the invention, the heating means provided in each of the blades are preferably all connected to a central control unit and a central power supply within the turbine. As well as preferably including individual control means, the heating means associated with each blade on a turbine are preferably also centrally controllable.

The central control unit for controlling the heating means may form part of the main control system of the wind turbine, or may at least be connected to the main control system. The central control unit can therefore control the heating means based on data and information regarding the wind turbine performance or conditions at the wind turbine. For example, as described above, the central control unit may be adapted to activate the de-icing system when a change in the power curve that is indicative of the presence of ice on the blade is detected. De-icing can therefore be commenced when the level of ice becomes sufficient to adversely affect the performance of the turbine.

Alternatively or in addition to any analysis of the power curves to detect the present of ice on the blades, wind turbines according to the invention may further comprise one or more ice sensors for detecting the presence of ice on at least one of the blades and providing an output to the central control unit, wherein the central control unit is adapted to activate the heating means within the one or more blades upon detection of ice.

The invention will be further described by way of example and with reference to the accompanying drawings in which.

Figure 1:
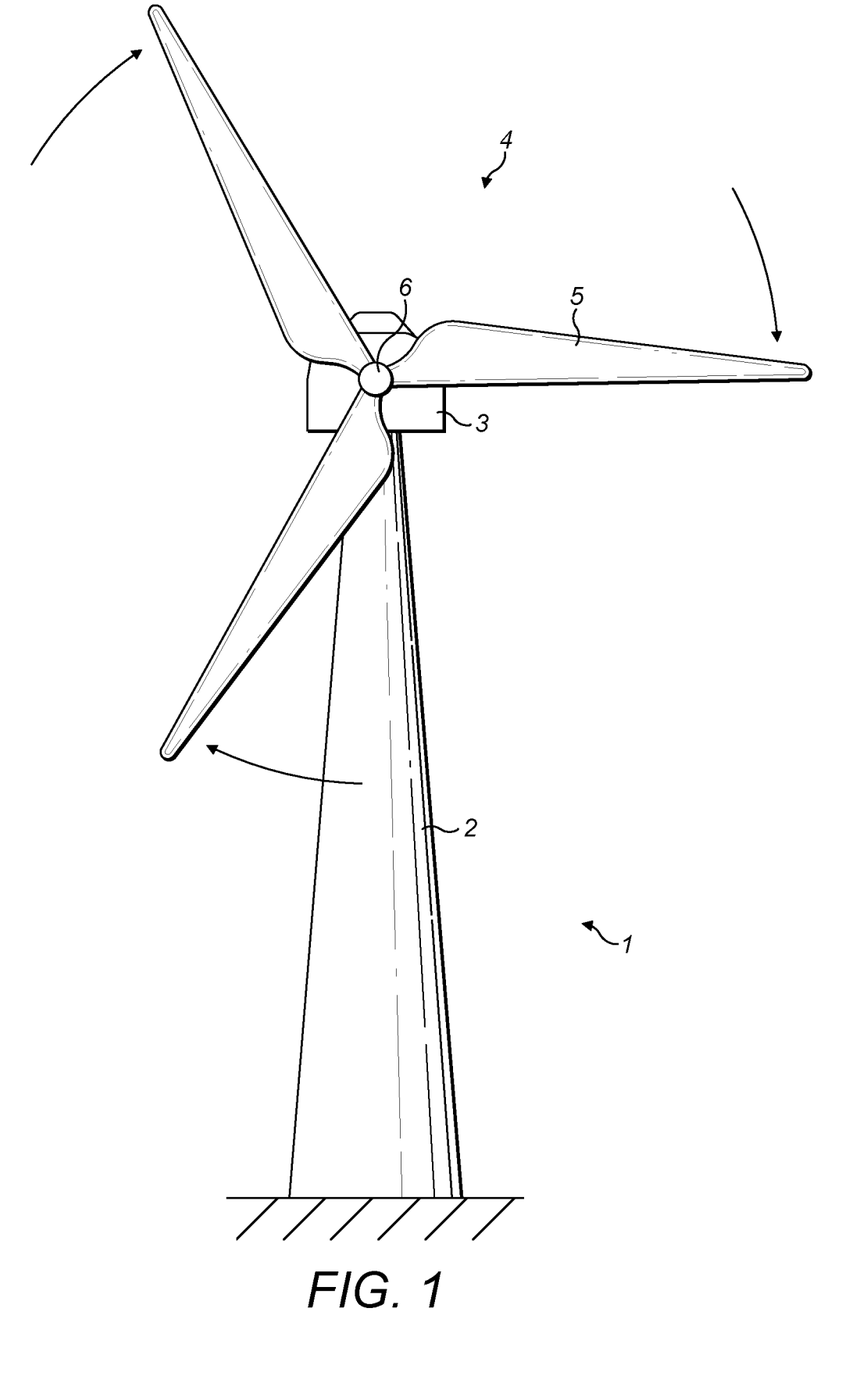
FIG. 1 shows a wind turbine according to the invention incorporating a de-icing system.

FIG. 1 illustrates an upwind wind turbine 1, comprising a wind turbine tower 2 on which a wind turbine nacelle 3 is mounted. A wind turbine rotor 4 comprising three spaced apart wind turbine blades 5 attached to a central hub 6 is mounted on the turbine. The wind turbine 1 illustrated in FIG. 1 may be a small model intended for domestic or light utility usage, or may be a large model, such as those that are suitable for use in large scale electricity generation on a wind farm. In the latter case, the diameter of the rotor may be as large as 100 meters or more. The invention is not limited to three bladed turbines although most commercial wind turbines use a three bladed rotor.

The wind turbine 1 incorporates a de-icing system for the de-icing of the blades 5. The de-icing system comprises heaters 10 mounted at the root end of each blade 5, all of which are connected to a power supply within the nacelle 3. As described in more detail below, each of the heaters 10 is adapted to supply heated air into the interior of the blade 5 and to establish a circulation of the heated air through the blade 5.

Figure 2:
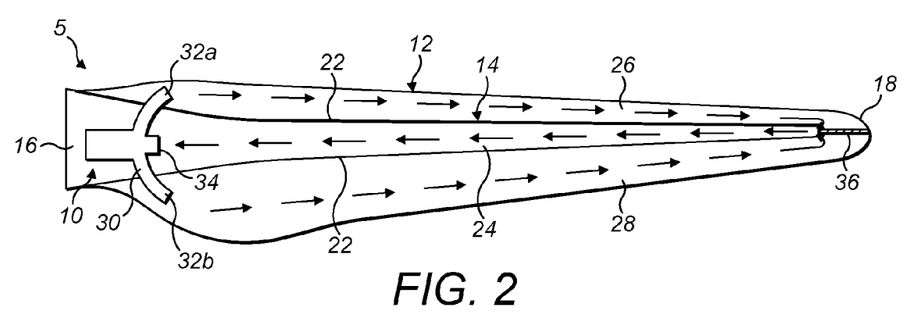
FIG. 2 shows a schematic longitudinal cross section of a wind turbine blade which is adapted for a de-icing method according to the first embodiment of the invention.

FIG. 2 shows a longitudinal cross section of one of the blades 5 and illustrates the internal structure within the blade 5. The structure is further illustrated in the transverse cross section of the blade shown in FIG. 3. The blade 5 comprises an outer shell 12 and an inner spar 14 extending within the outer shell in a longitudinal direction from the root end 16 of the blade to a position a short distance from the tip end 18 of the blade. The inner spar 14 is formed of a pair of opposed spar caps 20 which are integrated into the outer shell 12 at the pressure side and the suction side of the blade 5. A pair of opposed longitudinal webs 22 extend between the ends of the opposed spar caps 20 to form a hollow beam structure with an approximately square transverse cross section.

Figure 3:
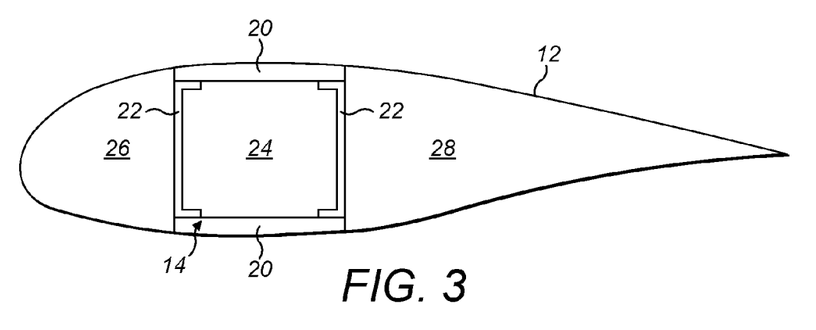
FIG. 3 shows a schematic transverse cross section through the blade of FIG. 1.

As can be seen from FIGS. 2 and 3, the longitudinal webs 22 define a cavity structure within the blade 5. A central cavity 24 is defined inside the inner spar 14, between the longitudinal webs 22. A leading edge cavity 26 is defined between the leading edge of the blade 5 and the longitudinal web 22 on the side of the inner spar 12 closest to the leading edge. A trailing edge cavity 28 is defined between the trailing edge of the blade 5 and the longitudinal web 22 on the side of the inner spar closest to the trailing edge.

The blade 5 shown in FIG. 2 is adapted for use with a de-icing method according to the first embodiment of the present invention. The heater 10 is mounted at the root end of the blade, within the central cavity 24 and comprises an air distribution manifold 30 which extends from the central cavity 24 into the leading edge 26 and trailing edge 28 cavities. The distribution manifold 30 comprises a first outlet 32$a$ positioned in the leading edge cavity 26, a second outlet 32$b$ positioned in the trailing edge cavity 28 and an inlet 34 positioned in the central cavity 24. A fan system (not shown) is incorporated within the heater, which is adapted to pump heated air out through the outlets 32$a,b$ and to draw air into the heater 10 through the inlet 34. Heating elements (not shown) are provided within the heater to heat the air as it is drawn through the heater 10 from the inlet 34 to the outlets 32$a,b$. Control means are provided in the heater 10 to control the temperature and the flow rate of the heated air pumped out through the outlets 32$a,b$.

In addition to the blade structure described above, the blade 5 comprises a partition 36 extending from the tip end of the blade into the opening of the inner spar 12 close to the tip end of the blade. The partition 36 effectively separates the leading edge cavity 26 from the trailing edge cavity 28 at the tip end of the blade.

During operation of the de-icing system in the blade 5, heated air is generated by the heater 10 at the root end 16 of the blade and pumped from the heater through outlets 32$a,b$ into the leading edge cavity 26 and the trailing edge cavity 28. The heated air flows in the direction of the arrows shown in FIG. 2, towards the tip end 18 of the blade. As the heated air flows through the blade cavities, heat is transferred from the air to the outer shell 12 in order to heat the blade surface. When the heated air reaches the tip end 18 of the blade 5, the partition 36 directs the air from each cavity into the central cavity 24. The heated air is then drawn back towards the root end 16 of the blade through the central cavity 24, where the air re-enters the heater 10 through the inlet 34. The air is continuously recycled around the blade interior, through the blade cavities defined by the longitudinal webs 22.

Figure 4:
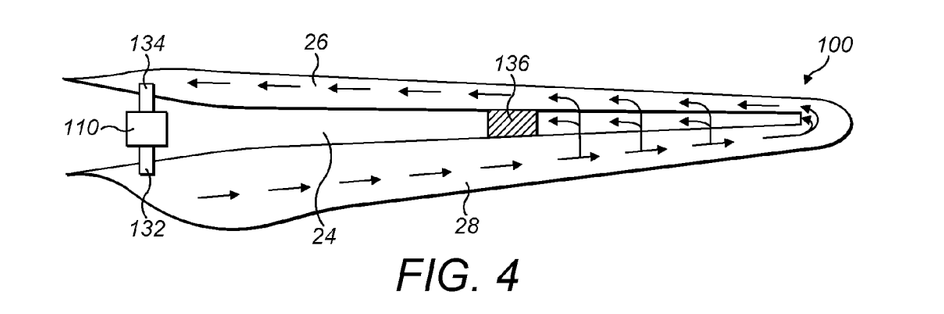
FIG. 4 shows a schematic longitudinal cross section of a wind turbine blade which is adapted for a de-icing method according to the second embodiment of the invention.

FIG. 4 shows a blade 100 having a similar internal structure to that shown in FIGS. 2 and 3 but which has been adapted for use with a de-icing method according to the second embodiment of the invention. As in the blade 5, the heater 110 of the blade 100 is mounted at the root end of the blade, in the central cavity 24. However, only a single outlet 132 is provided, which is positioned in the trailing edge cavity 28. The inlet 134 is positioned in the leading edge cavity 26.

The blade does not include any partition at the tip end but a partition 136 is provided in the central cavity 24, approximately one third of the way along the central cavity 24 from the tip end of the blade. The partition 136 blocks the central cavity 24 so that air cannot flow between the parts of the central cavity 24 on either side of the partition 136. A plurality of openings is provided in each of the longitudinal webs 22, which form flow pathways extending between the trailing edge cavity 28 and the leading edge cavity 26, through the central cavity 24.

During operation of the de-icing system in the blade 100, heated air is generated by the heater 110 at the root end of the blade and pumped from the heater through the outlet 132 into the trailing edge cavity 28. The heated air flows in the direction of the arrows shown in FIG. 3, towards the tip end of the blade. When the heated air reaches the tip end of the blade 100, the air is channeled around the tip end and into the central cavity 24 and the leading edge cavity 26. In the outer third of the blade, a portion of the heated air additionally passes into the central cavity 24 through the openings in the longitudinal web 22 separating the central cavity from the trailing edge cavity.

The heated air is drawn back towards the root end of the blade through the central cavity 24 and the leading edge cavity 26. As the heated air flows through the central cavity 24, it is gradually diverted into the leading edge cavity 26 through the openings in the longitudinal web 22 separating the central cavity form the leading edge cavity. All of the air is forced through the openings, since the partition 136 prevents the further flow of the air through the central cavity 24 towards the root end of the blade. All of the air therefore ends up in the leading edge cavity 26, where the air is drawn back to the root end of the blade and re-enters the heater 110 through the inlet 134. The air is continuously recycled around the blade interior, as described in relation to FIG. 2.

Figure 5:
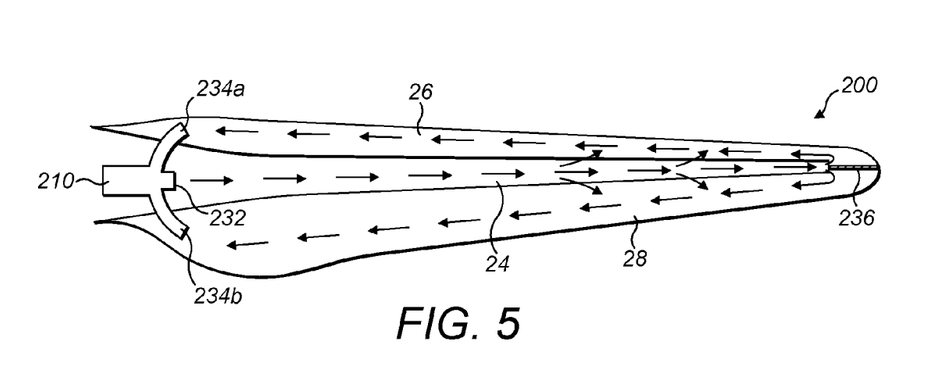
FIG. 5 shows a schematic longitudinal cross section of a wind turbine blade which is adapted for a de-icing method according to the third embodiment of the invention.

FIG. 5 shows a blade 200 having a similar internal structure to those shown in FIGS. 2 to 4 but which has been adapted for use with a de-icing method according to the third embodiment of the invention. As in the blades 5 and 100, the heater 210 of the blade 200 is mounted at the root end of the blade, in the central cavity 24. A single outlet 232 is provided, which is positioned in the central cavity 24. A first inlet 234$a$ is positioned in the leading edge cavity 26 and a second inlet 234$b$ is positioned in the trailing edge cavity 28.

At the tip end of the blade 200, a baffle 236 is provided which extends from the tip end of the blade 200 to the opening of the central cavity 24 adjacent the tip end. As in the blade 100 shown in FIG. 3, openings are provided in the outer third of the longitudinal webs 22 to provide flow pathways from the central cavity 24 into the leading edge 24 and trailing edge 28 cavities.

During operation of the de-icing system in the blade 200, heated air is generated by the heater 210 at the root end of the blade and pumped from the heater through the outlet 232 into the central cavity 24. The heated air flows in the direction of the arrows shown in FIG. 5, along the central cavity 24 towards the tip end of the blade. As the heated air passes through the outer third of the central cavity 24, a portion of the heated air is diverted from the central cavity 24, through the openings in the longitudinal webs 22 into the adjacent leading edge 26 and trailing edge 28 cavities. When the heated air reaches the tip end of the blade 200, the remainder of the heated air is directed by the baffle 236 into both the leading edge cavity 26 and the trailing edge cavity 28.

The heated air is then drawn back through the leading edge cavity 26 and the trailing edge cavity 28 to the root end of the blade, where the air re-enters the heater 210 through the respective inlets 234a,b.

In each de-icing method, the heater is activated upon detection of ice on the outer surface of the blade by ice sensors mounted on the blade. As the heated air is circulated through the blade cavities, the outer shell is heated and at least the layer of ice in contact with the blade surface is thawed. The ice then slips off the blade due to gravity. Once the ice has been removed, the heater may be switched off.

What is claimed is:

1. A method of de-icing a wind turbine blade, the method comprising:
    generating heated air using heating means provided in a root portion of the blade; and
    circulating the heated air around an interior of the blade through at least a portion of two more longitudinal blade cavities defined within the blade, the circulating including:
        channeling the heated air from an outlet of the heating means at least part way through a first longitudinal blade cavity, wherein the first longitudinal blade cavity is a trailing edge cavity defined between one or more longitudinal webs and a trailing edge of the blade, towards a tip end of the blade;
        at a position along a length of the blade, diverting a first portion of the heated air from the trailing edge cavity into a central cavity and diverting a second portion of the heated air from the trailing edge cavity into a leading edge cavity; and
        channeling the diverted air at least part way through the leading edge cavity and the central cavity back to an inlet of the heating means,
    wherein the heated air is circulated through the trailing edge cavity, the central cavity defined between longitudinal webs extending through the interior of the blade, and the leading edge cavity defined between one or more longitudinal webs and the leading edge of the blade.

2. A method according to claim 1 further comprising:
    at a position along the length of the blade, diverting the first portion of the heated air out of the central cavity into the leading edge cavity; and
    channeling the diverted first portion of the heated air back to the one or more inlets of the heating means in combination with the second portion of heated air in the leading edge cavity.

3. A method according to claim 1 wherein the heated air is diverted from the trailing edge cavity into the central cavity and the leading edge cavity in a tip portion of the blade.

4. A method according to claim 3 comprising diverting the first portion of the heated air out of the central cavity into the leading edge cavity at least one quarter of the way along the length of the blade from the tip end.

5. A method according to claim 1 wherein the heated air is circulated through the interior of the blade using one or more fans provided within the heating means.

6. A method according to claim 1 further comprising:
    monitoring a temperature at the blade; and
    controlling the heating means to adjust the temperature of the heated air generated depending on the temperature at the blade.

7. A method according to claim 1 further comprising:
    monitoring an air flow within the blade; and
    controlling the heating means depending on the air flow within the blade.

8. A method according to claim 6 comprising controlling at least one of: a power supplied to the heating means and a flow rate of air through the heating means.

9. A method according to claim 1 further comprising:
    monitoring the blade using one or more sensors to detect a presence of ice on a blade surface; and
    activating the circulation of heated air upon detection of ice on the blade surface.

10. A method according to claim 1 further comprising:
    monitoring a power curve of the wind turbine to detect a change in the power curve as a result of a presence of ice on the blade surface; and
    activating the circulation of heated air upon detection of ice on the blade surface.

11. A wind turbine including one or more wind turbine blades, each blade comprising:
    an outer shell;
    one or more longitudinal webs provided within the outer shell and extending longitudinally through an interior of the blade, wherein the one or more longitudinal webs define a cavity structure within the interior of the blade including: a longitudinal leading edge cavity defined between a leading edge of the blade and one or more longitudinal webs, a longitudinal trailing edge cavity defined between a trailing edge of the blade and one or more longitudinal webs, and a central cavity defined between a pair of longitudinal webs and positioned between the leading edge cavity and the trailing edge cavity;
    a partition within the central cavity at a position along a length of the central cavity and one or more openings within the longitudinal webs to provide a flow pathway between the central cavity and the leading edge cavity, wherein the one or more openings are provided at one or more locations between the partition and a tip end of the blade; and
    heating means provided in a root portion of the blade, the heating means comprising:
    one or more air inlets for receiving air channeled through the leading edge cavity; one or more heaters for heating air entering through the one or more air inlets; one or more air outlets for channeling heated air into the trailing edge cavity of the blade; and means for circulating the heated air from the one or more air outlets around the interior of the blade and back to the one or more inlets, wherein the heating means are adapted to circulate heated air through the trailing edge cavity, the leading edge cavity and the central cavity.

12. A wind turbine according to claim 11 wherein each blade further comprises means for diverting the heated air from one of the longitudinal leading edge cavity and the longitudinal trailing edge cavity into at least one of the other longitudinal cavities.

13. A wind turbine according to claim 12 wherein each blade comprises diverting means provided between at least two of the longitudinal blade cavities, in the tip portion of the blade.

14. A wind turbine according to claim 13 wherein the diverting means provided in the tip portion of the blade comprises a partition extending from the tip end of the blade.

15. A wind turbine according claim 12 wherein each blade comprises diverting means provided at an intermediate position between the root portion of the blade and the tip end of the blade.

16. A wind turbine according to claim 11 wherein the heating means of each blade is provided within the central cavity of the blade.

17. A wind turbine according to claim 11 wherein each blade further comprises means for isolating the longitudinal cavities from each other at the root portion of the blade.

18. A wind turbine according to claim 11 wherein each blade comprises an inner spar extending through the interior of the blade, the spar including a pair of webs defining the central cavity inside the inner spar.

19. A wind turbine according to claim 11 wherein insulation material is provided within the trailing edge cavity defined inside the blade, along at least a part of the length of the blade.

20. A wind turbine according to claim 11 wherein insulation material is provided within the central cavity of each blade, along at least a part of the length of the blade.

21. A wind turbine blade according to claim 11 wherein each blade further comprises one or more air ducts for channeling the heated air into or out of the heating means.

22. A wind turbine according to claim 11 wherein each blade further comprises control means for controlling the heating means within that blade.

23. A wind turbine according to claim 22 wherein each blade further comprises one or more temperature sensors for monitoring the temperature at the blade and providing an output to the control means within that blade, wherein the control means is adapted to operatively control the associated heating means based on the output received from the temperature sensors.

24. A wind turbine according to claim 22 wherein each blade further comprises one or more pressure sensors for monitoring the airflow within the blade, wherein the control means is adapted to operatively control the associated heating means based on a received output from the pressure sensors, such that the heating means is turned off when the air flow within the blade falls below a threshold level.

25. A wind turbine according to claim 23 wherein the control means is adapted to operatively control at least one of: a power supplied to the one or more heaters, a speed through which air is circulated through the heating means, and a heating cycle of the one or more heaters.

26. A wind turbine according to claim 11 comprising a plurality of wind turbine blades, wherein the heating means provided in each of the blades are connected to a central control unit and a central power supply within the turbine.

27. A wind turbine according to claim 26 further comprising one or more ice sensors for detecting a presence of ice on at least one of the plurality of wind turbine blades and providing an output to the central control unit, wherein the central control unit is adapted to activate the heating means within the at least one of the plurality of wind turbine blades upon detection of ice.

* * * * *